United States Patent
Fuller

(10) Patent No.: US 7,278,951 B2
(45) Date of Patent: Oct. 9, 2007

(54) HYDRAULIC CONTROL CIRCUIT FOR A CONTINUOUSLY VARIABLE TRANSMISSION

(75) Inventor: John William Edward Fuller, Preston (GB)

(73) Assignee: Torotrak (Development) Limited (GB)

( * ) Notice: Subject to any disclaimer, the term of this patent is extended or adjusted under 35 U.S.C. 154(b) by 714 days.

(21) Appl. No.: 10/476,330

(22) PCT Filed: May 1, 2002

(86) PCT No.: PCT/GB02/02024

§ 371 (c)(1),
(2), (4) Date: Apr. 22, 2004

(87) PCT Pub. No.: WO02/088577

PCT Pub. Date: Nov. 7, 2002

(65) Prior Publication Data

US 2004/0171451 A1    Sep. 2, 2004

(30) Foreign Application Priority Data

| May 1, 2001 | (GB) | ................................. | 0110597.2 |
| Jul. 5, 2001 | (EP) | ................................. | 01305802 |
| Jul. 5, 2001 | (GB) | ................................. | 0116473.0 |

(51) Int. Cl.
*F16H 61/38* (2006.01)
(52) U.S. Cl. .............................. 476/9; 476/10; 476/41; 477/37

(58) Field of Classification Search .................... 476/9, 476/10, 40, 41; 477/37, 50
See application file for complete search history.

(56) References Cited

U.S. PATENT DOCUMENTS

| 4,524,641 | A | | 6/1985 | Greenwood |
| 4,662,248 | A | | 5/1987 | Greenwood |
| 5,938,557 | A | * | 8/1999 | Greenwood .................. 475/216 |
| 6,626,793 | B1 | * | 9/2003 | Greenwood ................... 476/10 |
| 7,056,261 | B2 | * | 6/2006 | Fuller ........................... 476/10 |

FOREIGN PATENT DOCUMENTS

| DE | 195 34 391 A1 | 3/1997 |
| DE | 19757015 A1 | 6/1999 |
| GB | 2 312 258 A | 10/1997 |
| GB | 2 337 090 A | 11/1999 |

\* cited by examiner

*Primary Examiner*—William C. Joyce
(74) *Attorney, Agent, or Firm*—Brooks Kushman P.C.

(57) ABSTRACT

A hydraulic control circuit is disclosed for a continuously variable transmission comprising a continuously variable ratio transmission unit ("variator") 10, the circuit comprising a supply line 106 and means (which may take the form of a pump 110) for providing a flow of pressurised fluid in the supply line, means (which may comprise a pressure control valve 116) for generating a back pressure in the supply line, and at least one connection for feeding fluid from the supply line to a hydraulic actuator 100 acting on a movable torque transmission 23-37 element (which may comprise a roller 28) of the variator 10. The valve means 152 connected to the supply line allows pressure in the supply line to be selectively modified in response to rate of flow in the supply line.

25 Claims, 7 Drawing Sheets

HYDRAULIC CONTROL CIRCUIT FOR A CONTINUOUSLY VARIABLE TRANSMISSION

BACKGROUND OF THE INVENTION

1. Field of the Invention

The present invention relates generally to continuously variable transmissions and more specifically to hydraulic control thereof.

2. Background Art

Continuously variable transmissions comprise, inter. alia an input shaft rotatable by a prime mover, an output shaft connected to vehicle wheels and a ratio varying component (hereinafter referred to as a "variator") disposed between the input and output shafts. The variator is typically controlled by means of hydraulic pressures which can adjust the effective ratio of the variator in accordance with a driver's demands, road conditions and the like. Under steady or smoothly-changing conditions the required flows of hydraulic fluid are relatively small. However, problems can sometimes occur during rapid ratio changes of the variator, for example during braking, rapid engine acceleration or abuse conditions. During such rapid ratio changes, the flows of fluid can be excessive, resulting in adverse system controllability.

This is particularly, but not exclusively, applicable in the case of torque control variators.

Major components of a known torque-control variator 10 of the "full toroidal", toroidal-race rolling traction type are illustrated in FIG. 1. Here, two input discs 12, 14 are mounted upon a drive shaft 16 for rotation therewith and have respective part toroidal surfaces 18, 20 facing toward corresponding part toroidal surfaces 22, 24 formed upon a central output disc 26. The output disc is journalled such as to be rotatable independently of the shaft 16. Drive from an engine or other prime mover, input via the shaft 16 and input discs 12, 14, is transferred to the output disc 26 via a set of rollers disposed in the toroidal cavities. A single representative roller 28 is illustrated but typically three such rollers are provided in both cavities. An end load applied across the input discs 12, 14 by a hydraulic end loading device 15 provides contact forces between rollers and discs to enable the transfer of drive. Drive is taken from the output disc to further parts of the transmission, typically an epicyclic mixer, as is well known in the art and described eg. in European patent application 85308344.2 (published as EP 0185463). Each roller is journalled in a respective carriage 30 which is itself coupled to a hydraulic actuator 32 whereby a controlled translational force can be applied to the roller/carriage combination. As well as being capable of translational motion the roller/carriage combination is able to rotate about an axis determined by the hydraulic actuator 32 to change the "tilt angle" of the roller and so move the contacts between rollers and discs, thereby varying the variator transmission ratio, as is well known to those skilled in the art.

As mentioned above, the illustrated variator is of the type known in the art as "torque control". The hydraulic actuator 32 exerts a controlled force on the roller/carriage and for equilibrium this must be balanced by the reaction force upon the roller resulting from the torques transmitted between the disc surfaces 18, 20, 22, 24 and the roller 28. As is well known in the art, the centre of the roller is constrained to follow the centre circle of the torus defined by the relevant pair of discs. The axis determined by the actuator 32 is angled to the plane of this centre circle. This angle is referred to as the "castor angle". The well known result of this arrangement is that in use each roller automatically moves and precesses to the location and tilt angle required to transmit a torque determined by the biasing force from the actuator 32.

The biasing force is controlled by means of a hydraulic circuit through which fluid is supplied to the actuators at variable pressure.

It will be appreciated that while the equilibrium position of the rollers is determined by the balance of the reaction force and the applied biasing force, there is the potential for unwanted oscillatory motion of the roller/carriage combination about this position, with resulting impairment of transmission function. More than one mode of oscillation is possible but in the simplest such mode all rollers oscillate in unison and this oscillatory motion is accompanied by a corresponding flow of fluid in the hydraulic circuit.

Damping of such oscillation can be provided by means of the hydraulic circuit and specifically by restricting or throttling fluid flow to and from the actuators 32. During a change in variator transmission ratio, the rollers 28 must move and precess to new positions, fluid thus being expelled from one side of the pistons of the actuators 32 and taken in on the other side. Under these conditions, if fluid flow in the hydraulic circuit is suitably restricted, pressure is increased in the hydraulic circuit on the side of fluid expulsion and diminished on the other side of the circuit, modifying the net force exerted on the rollers by the actuators such as to tend to resist roller motion and thus to create a torque between the variator input and output discs.

The effect is two-fold:
 i. damping is provided, which helps to deliver smooth non-oscillatory variator response, particularly when installed in a mechanical power train; but
 ii. the torque created resists required ratio change, which can impair transmission performance during rapid transient events such as rapid braking and rapid acceleration.

Particularly stringent requirements are imposed on the transmission by such "transients"—rapid changes in the operating conditions of the vehicle requiring correspondingly rapid changes of transmission ratio. An emergency stop or "brake to rest" is one example. In order to maintain engine speed and to avoid stalling the engine during a brake to rest, rapid ratio change is required of the variator. This is particularly significant in a transmission of the "geared neutral" type in which the variator remains coupled to the vehicle's wheels even while the wheels are stationary—that is, in vehicles lacking a clutch or other means to isolate wheels and engine. The high rate of ratio change required during rapid brake to rest corresponds to a rapid motion of the variator rollers and their associated pistons. Large flows are created in the hydraulic control circuit. If adequate hydraulic flow to accommodate such motion is not available—particularly because such flow is restricted—the rollers can fail to move with sufficient speed, leading eg. to an engine stall. Within the hydraulic circuit the effect can be a large increase in pressure on one side of the circuit and a large fall in pressure on the other side of the circuit. The result must be a large net biasing force on the roller/carriage combinations and this is reflected in a large variator torque which is the cause of the engine stall.

SUMMARY OF THE INVENTION

It has been found in practice that the level of damping required to achieve smooth transmission operation can unacceptably inhibit variator response when rapid transients occur. Achieving the necessary balance of stability against response has proved problematic. Overcoming or at least alleviating this problem is an object of the present invention.

This need is not unique to toroidal-race rolling-traction type variators but is also applicable to many other types of hydraulically controlled variators, for example variators of the band-and-sheave type where the separation of the sheaves of each of two pulley units around the band is entrained is controlled by hydraulic pressure.

In accordance with the present invention, there is a hydraulic circuit for a continuously variable transmission comprising a continuously variable ratio transmission unit ("variator") which is controllable by application of fluid pressure to at least one hydraulic actuator acting on a movable torque transmission element of the variator, the circuit comprising a fluid supply line connected to the hydraulic actuator for feeding fluid to and from the hydraulic actuator, means for providing a flow of fluid through the fluid supply line, variable control valve means in the fluid supply line downstream of the connection to the hydraulic actuator for generating an adjustable back pressure therein, and further valve means connected to the fluid supply line to selectively modify pressure in the supply line in response to rate of fluid flow in the supply line.

In such a circuit the path controlled by the valve means can serve to vent and/or supplement fluid flow through the flow line and thus to allow increased flow in response to transients.

By reacting to flow rate in the line rather than pressure therein, the further valve means allows transient contditions to be accomodated without imparing control of the variator by the variable control valve means.

Where the invention is applied to a toroidal-race rolling traction type variator, the movable torque transmission element takes the form of a variator roller. The roller 28 illustrated in FIG. 1 is an example.

Preferably the further valve means comprises a valve which controls a further connection to the supply line to modify pressure in the supply line.

Preferably, the valve means is controlled such that its degree of opening is substantially constant while the rate of flow in the flow line is within a chosen range. Still more preferably the valve means is closed while the rate of flow is within the chosen range.

It has been found, somewhat unexpectedly, that in this way stable controllable operation of the variator can be achieved while also enabling rapid response to transients.

Preferably the valve has a variable opening controlled as a function of the supply line flow rate. A variable opening valve is of further assistance in maintaining variator stability.

It is preferred that the valve means comprises a pilot operated valve having a spool which is controlled by pilot pressures from upstream and downstream of the flow restrictor.

The valve means preferably control a path to a low pressure area in order to vent excess fluid from the flow line. In this way the valve means can prevent excessive pressure build up in the flow line.

Additionally or alternatively, the valve means may control a path connected to a pressurised accumulator in order to selectively supplement fluid flow into the flow line.

An important advantage of such an embodiment is that the capacity required of the means for providing flow of pressurised fluid (typically formed as a pump) can be reduced as compared with existing circuits in which this capacity is chosen to meet the maximum requirements of the circuit. Provision of the accumulator allows the flow in the line to be supplemented when required, from the accumulator, so that the pump need not supply the maximum required rate of flow.

In certain preferred embodiments of the present invention the further valve means comprises a flow limiting valve in the supply line. Flow limiting valves are known in the art of hydraulics. This valve may serve to limit the maximum flow to the variable control valve means or to ensure a minimum flow thereto. Two such valves may be provided in the supply line to serve both functions.

Practical circuits generally control double acting actuators and in a further preferred embodiment of the present invention the circuit comprises a pair of fluid supply lines, the hydraulic actuator being double acting and receiving opposed fluid pressures from the two supply lines, each supply line having a said variable control valve means and a said further valve means.

BRIEF DESCRIPTION OF THE DRAWINGS

A specific embodiment of the present invention will now be described, by way of example only, with reference to the accompanying drawings, in which:—

DETAILED DESCRIPTION OF THE PREFERRED EMBODIMENTS

Figure 1:
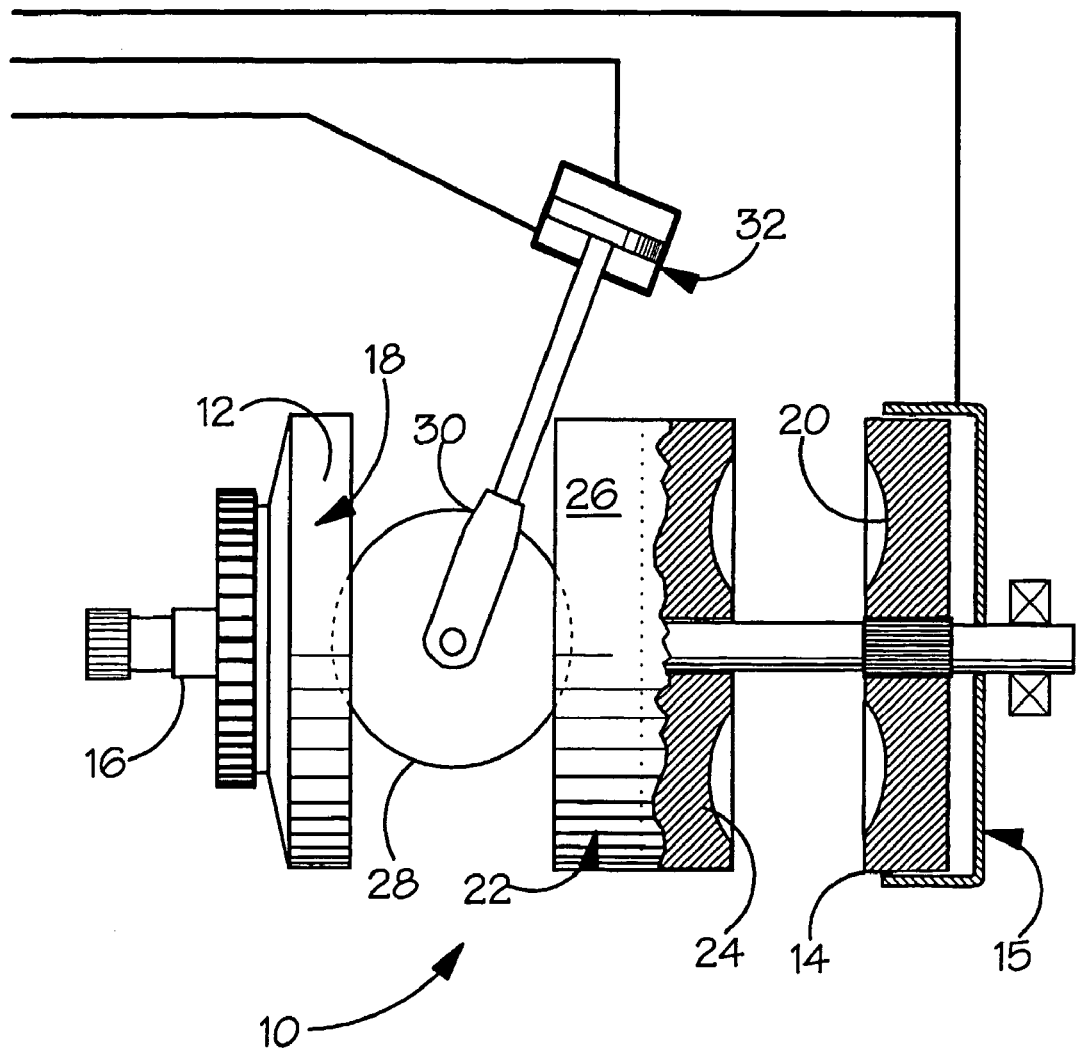
FIG. 1 is a simplified illustration of a known toroidal-race rolling traction type variator which is suitable for control by the hydraulic circuit to be described below.
Figure 2:
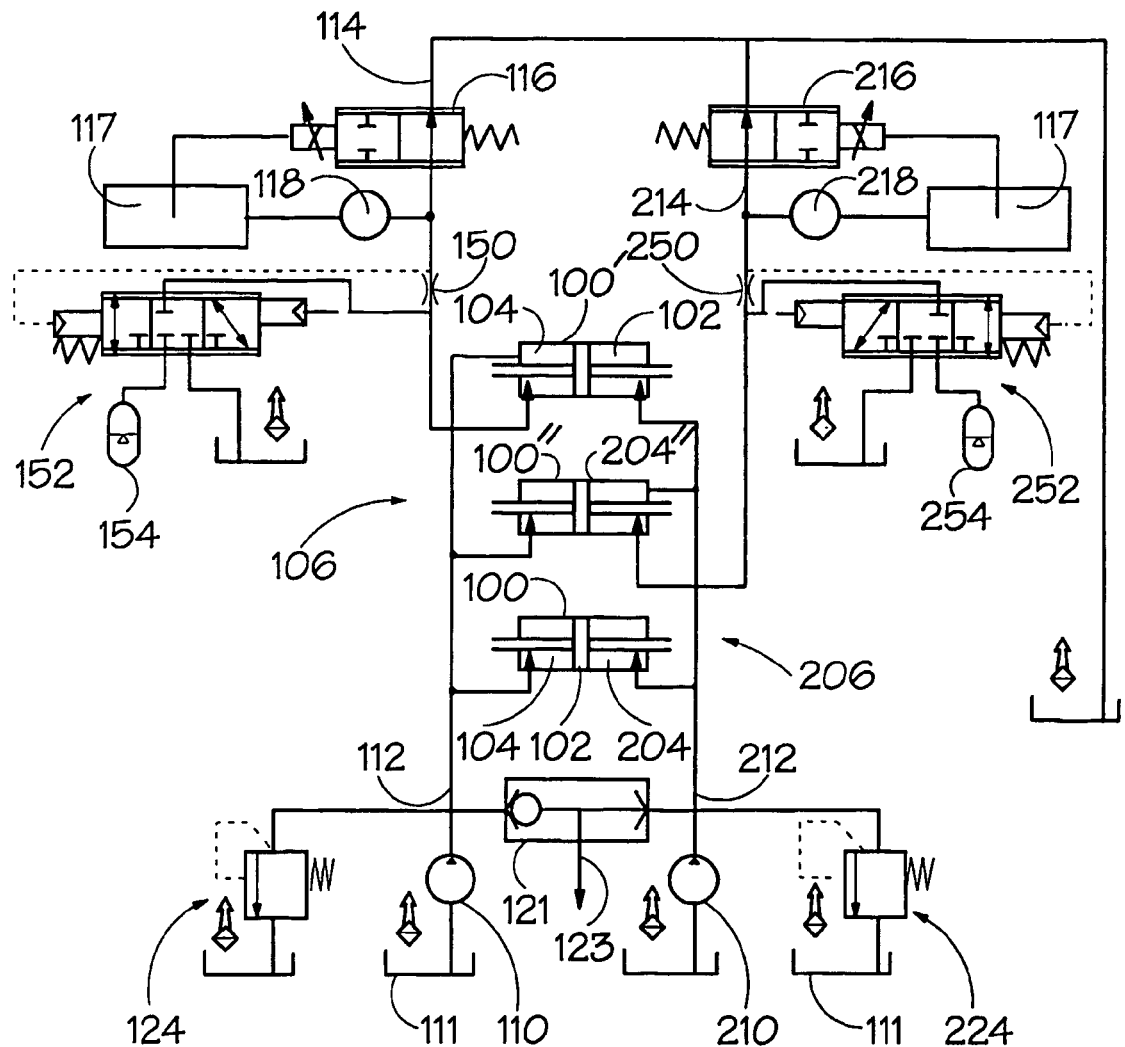
FIG. 2 is a schematic diagram of a hydraulic circuit embodying the present invention.

The hydraulic circuit illustrated in FIG. 2 is suitable for use with a torque control variator of the type described above with reference to FIG. 1. FIG. 2 shows, by way of illustration, a set of three hydraulic actuators 100, 100' and 100" (typically in a variator of the above described twin cavity type, six such actuators would be provided—three per cavity—but remaining actuators are omitted for the sake of clarity). Each actuator comprises a piston 102 whose two faces are exposed to control pressure in first and second working chambers 104, 204 so that the biasing force applied by each actuator is determined by the difference in these control pressures. Each actuator 100 is coupled to a corresponding roller/carriage assembly of the type illustrated in FIG. 1.

The hydraulic circuit provides a first flow line 106 for supplying hydraulic fluid to the first working chambers 104 and a second flow line 206 for supplying fluid to the second working chambers 204.

The first flow line 106 comprises a supply line 112 and a drain line 114. A pump 110 draws hydraulic fluid from a sump 111 (and it should be noted that while the diagram shows the symbol for the sump in several places, these are all the same item: the circuit has one sump only) and supplies a pressurised flow of fluid through the supply line 112 to the first working chambers 104 of the actuators 100. The supply line is branched to connect to all of the first working chambers 104. The drain line however is only directly connected to one of these chambers—chamber 104' of actuator 100', referred to as the first master actuator. Pressure in the supply line 112—and hence in the actuator working chambers 104—is adjusted by means of a first pressure control valve 116 incorporated in the drain line 114. This valve is controlled by an electronic control unit (ECU) 117. It is again to be understood that while the symbol for the ECU is seen in two places on the diagram for the sake of representational convenience, these symbols both refer to a single such unit. From the downstream side of the pressure control valve 116, the drain line leads back to the sump 111 from which the hydraulic fluid is recirculated.

The second flow line 206 is similarly formed to the first, comprising a second supply line 212 which supplies pressurised hydraulic fluid from a second pump 210 to the second working chambers 204 and a second drain line 214 leading via a second pressure control valve 216 to the sump 111. The second drain line 214 is connected to working chamber 204" of a second master actuator 100".

The master actuators 100' and 100" provide limits to the actuator travel, as is known in the art. When the pistons 102 move sufficiently far to the left, piston 102' of the first master actuator 100' covers the mouth of the drain line 114, preventing further exhaustion of fluid therethrough and thus preventing further motion of the pistons to the left. The second master actuator 100" limits travel of the pistons to the right in an analogous manner.

The ECU 117 monitors pressure in both of the flow lines 106, 206 by means of respective pressure transducers 118, 218 and controls the opening of the pressure control valves 116, 216. The purpose of the valves is to create an adjustable back pressure in the flow line. On the downstream (drain) side of the valves pressure in the circuit is low. Typically this region is close to or at atmospheric pressure. Upstream of the valves is normally a higher pressure, controlled by means of the valves 116, 216. In this way, by setting the pressure control valves 116, 216, the ECU influences the pressures applied to, and the forces applied by, the actuators 100. Note however that these pressures and forces are determined not only by the valves 116, 216 but also by the torques to which the variator is subject and the consequent motions of the rollers/pistons. This will be explained further below.

FIG. 2 also shows a valve arrangement 121 of the "highest pressure wins" type having a respective input connected to both of the supply lines 112, 212. The arrangement supplies via its output 123 hydraulic fluid from whichever supply line is at higher pressure to a hydraulic actuator (item 15 in FIG. 1) for applying required end load to the variator discs. Also shown in FIG. 2 are first and second pressure limiting valves 124, 224 connected respectively to the first and second supply lines 112, 212.

Reference has been made above to the need to damp oscillatory motion of the pistons 102 and hence of the rollers to which they are connected. While a degree of damping exists in the circuit by virtue in particular of the pressure control valves 116, 216, which tend to restrict surges of fluid flow, damping is also provided in the illustrated circuit by first and second restrictors 150, 250 incorporated respectively in the first and second flow lines. More specifically, each restrictor is connected in the respective drain line 114, 214, downstream of connections of the flow line to the actuator working chambers but upstream of the respective pressure control valve 116, 216. The restrictors are formed as metering orifices, having a reduced cross section relative to other regions of the flow line and a small extent in the direction of fluid flow (ie. a sharp edged orifice). The viscosity of the hydraulic fluid is, unavoidably, dependent to some degree on temperature. The metering effect of an orifice having a small extent along the flow direction is less dependent on viscosity, and hence less variable with temperature, than that of a longer restricted passage. In use, flow through each restrictor creates a pressure differential across it, the downstream side being at lower pressure. This pressure differential is approximately proportional to the square of the rate of fluid flow. The effect is to oppose surges of fluid flow, including those due to variator roller oscillation, and thus to damp the roller's movement.

As pointed out above, a circuit which provides adequate damping can prove problematic during transient rapid variator ratio change. The circuit illustrated in FIG. 2 incorporates compensation valves 152, 252 which obviate such problems. Consider first of all, however, the effect of a rapid ratio change on a circuit which lacked these valves. Suppose that the actuator pistons are required to move in the direction to the left in FIG. 2. Fluid must be expelled from the first actuator chambers 104 into the first flow line 106 and this extra fluid can only flow away through the first restrictor 150 and the first pressure control valve 116. The increased flow rate thus required through these parts creates increased back pressure across them, raising pressure in the first flow line 106 and opposing the required movement of the pistons, and so of the variator rollers. On the other side of the circuit, there is a requirement for flow of fluid into the second actuator working chambers 204 and, unless back flow takes place in the drain line 214 of the second flow line 206, this increased flow rate must be supplied by the pump. In known circuits, the required flow rate can exceed the pump capacity, leading to a major drop in pressure on this side of the circuit which again opposes the required piston/roller movement and may give rise to cavitation. Even without the restrictors 150, 250, such problems of excessive flow requirements can arise due to the limited opening of which the pressure control valves 116, 216 are capable and the limited capacity of the pumps 110, 210.

The compensation valves 152, 252 allow such problems to be avoided by venting fluid from the high pressure flow line and also in the illustrated embodiment by injecting fluid to the low pressure flow line as required to keep pressures within acceptable limits. While other valve constructions are possible within the scope of the present invention, in the illustrated embodiment each compensation valve 152, 252 is formed as a double pilot operated directional control valve. This valve has a proportional response. Its operation will now be described with reference to FIGS. 2 and 3.

Figure 3:
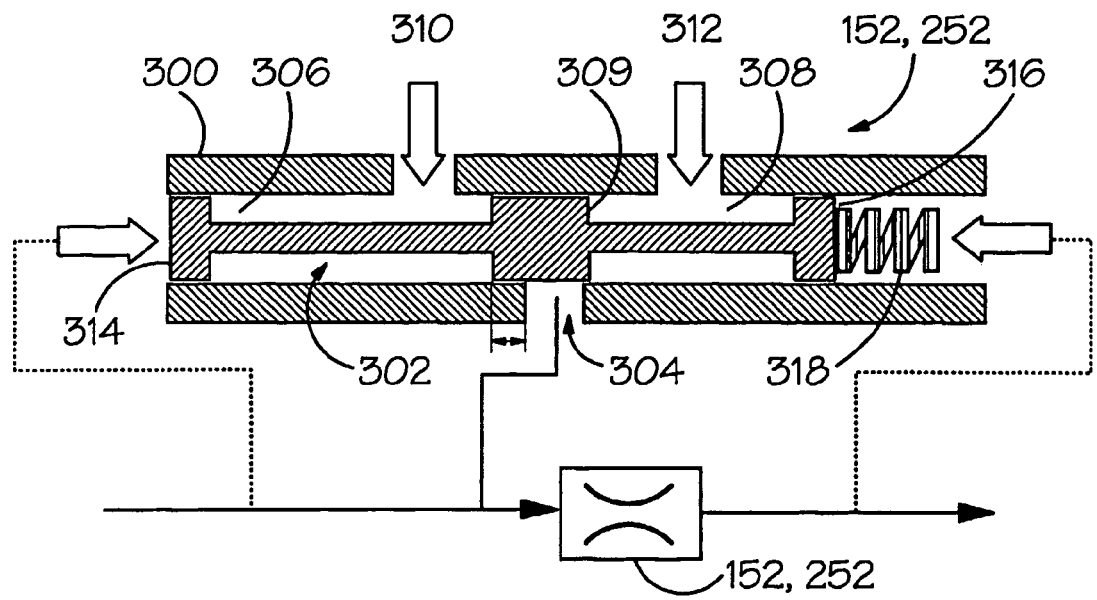
FIG. 3 is a schematic illustration of a control valve utilised in the FIG. 2 circuit and of connections thereto.

The compensation valve 152, 252 illustrated in FIG. 3 responds to the pressure differential across its associated restrictor 150, 250. It comprises a valve cylinder 300, a valve spool 302 movable along the cylinder and three ports:

i. a common port 304 which is selectively connectable through respective communication chambers 306, 308 defined in the cylinder 300 by the spool 302, on either side of a head 309, to either of ii. an outlet port 310 connected to a path to the sump 111 and iii. an inlet port 312 connected to an accumulator 154, 254 (see FIG. 2). The accumulator is constantly maintained at high pressure (eg. in the range 45-55 bar) and will be described in more detail below.

The common port 304 is connected to the associated flow line 106 or 206 upstream of its restrictor 150, 250. In the illustrated embodiment this connection is made to a point in the drain line 114, 214, downstream of connections to the hydraulic actuators 100.

The position of the spool 302 in the cylinder 300 is controlled by pilot pressure signals taken from upstream and downstream of the associated restrictor 150, 250 and applied to respective opposed faces 314, 316 of the spool 302. The force exerted on the spool by these pilot pressure signals is not nomnally equal, since flow through the restrictor 150, 250 produces a back pressure across it, but the resultant net force on the spool is opposed by a spring 318 acting on the spool (an additional or alternative way to balance the force on the spool would be to change the relative areas of the faces 314, 316, as will be apparent to one skilled in the art). The valve characteristics are in the present embodiment chosen such that during normal, non-transient variator operation the spool head 309 closes the common port 304. That is, during non-transient operation the rate of flow through the associated flow line 106, 206 and the resultant pressure differential across the restrictor 150, 250 are such as to maintain the compensation valve 152, 252 in a closed state. Consequently during such operating conditions the compensation valves 152, 252 do not, in the present embodiment, significantly affect the function of the hydraulic circuit. The valve head is longer, in the direction of valve spool movement, than the common port 304 which it controls, as indicated by a double-headed arrow in FIG. 3. Consequently the valve has a "deadband". That is, some valve spool movement can take place (corresponding to non-transient variator operation) without opening of the compensation valve 152, 252.

Consider however what happens during transient, rapid, variator ratio change, the actuator pistons 102 again moving to the left as viewed in FIG. 2. Fluid expelled from the first actuator working chambers 104 again causes pressure rise in the first flow line 106 and an increased rate of flow from it. The pressure differential across the first restrictor 150 consequently increases (because, as explained above, the pressure differential relates to the square of the flow rate through the restrictor) and the pilot pressure signals to the first compensation valve 152 are correspondingly altered. Looking again at FIG. 3, pressure on spool face 314 (connected to the upstream side of the first restrictor 150) increases more than pressure on opposed face 316 (connected to the downstream side of the first restrictor 150). Thus the spool is displaced, to the right as viewed in FIG. 3, and if this displacement is sufficient to move the spool beyond its deadband then the common port 304 of the compensation valve 152 is connected to its outlet port 310. A path is thereby opened for flow of hydraulic fluid out of the first flow line 106, to the sump 111. Note that the degree of opening of the valve is variable and is related to the pressure differential across the restrictor 150. That is the valve has a progressive response. A large back pressure, corresponding to a requirement for a large flow rate, produces a correspondingly large valve opening suitable to accommodate the large flow. This progressive response is of assistance in maintaining transmission stability and the currently preferred valve characteristics will be explained below.

Note also that due to the configuration of the illustrated circuit, the first compensation valve 152 (and similarly the second valve 252) can be thought of as operating in a negative feedback loop. Fluid vented from the flow line through the first compensation valve 152 reduces rate of flow through the first restrictor 150 and hence tends to reduce the valve opening. The result is a stable, progressive control of the valve. The valve 152 in effect reacts to and regulates flow through its line 106. Note however that the valve 152 does not react to changes in line pressure as such except so far as these result in changes of flow rate.

Looking now at the other side of the hydraulic circuit, the leftward displacement of the pistons 102 produces a requirement for rapid fluid flow into the second actuator working chambers 204. Consequently flow through the second restrictor 250, and hence pressure differential across it, are reduced and again the pilot pressure signals to the compensation valve 252 are correspondingly altered. The pressure differential across the spool 302 of the second compensation valve 252 is reduced and the spool consequently moves, under the biasing force of the spring 318, to open a path from the second flow line 206 to the accumulator 254. The accumulator 254 is maintained at a pressure higher than that of the second flow line 206, so that the effect of opening of the second compensation valve 252 is to cause fluid flow into the flow line as required to prevent excessive pressure drop therein. Again this is done in a progressive manner and is subject to control through a negative feedback loop effect.

The ECU 117 can also be programmed to react to differential pressure produced by transients by appropriate control of the pressure control valves 116, 216. For example, the pressure control valve 216 in the low pressure side may be closed while the pressure control valve 116 in the high pressure side is fully opened, to assist in compensating for—and reducing—the pressure changes during transients.

Of course when the requirement is for motion of the pistons 102 in the opposite direction, to the right in FIG. 2, the roles of the two compensation valves 152, 252 are swapped, but in other respects the function of the circuit is as described above. Opening of the two compensation valves 152, 252 need not be simultaneous and some transients may for example cause opening of one but not the other.

Figure 4:
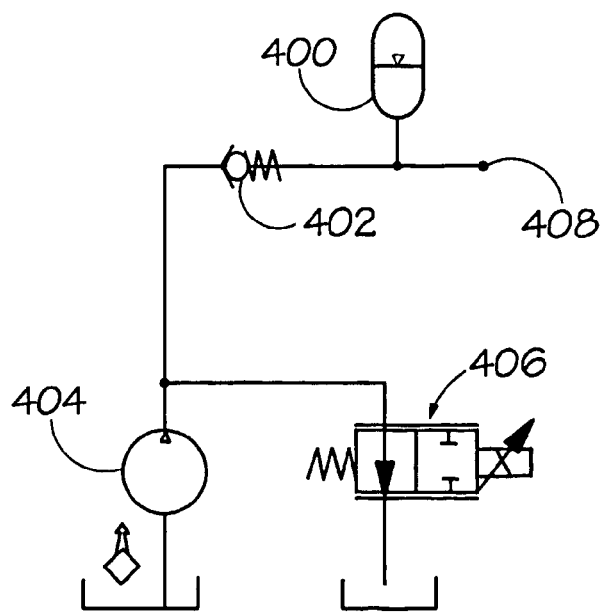
FIG. 4 is a schematic diagram of an accumulator circuit forming part of the FIG. 2 circuit.

Various possible accumulator constructions will be known to those skilled in the art but preferably the accumulator has an accumulator vessel, having a resiliently variable volume, connected in an unloader circuit which tops up the vessel without continuously requiring high pressure pump flow. FIG. 4 illustrates a suitable circuit, the vessel being seen at 400 and connected via a non-return valve 402 to a pump 404. A valve 406 diverts the pump output to the sump 111 when the required pressure is achieved in the accumulator vessel and the circuit's output is at 408.

The characteristics of the compensation valves 152, 252 must be chosen to suitably balance the requirements for hydraulic damping (necessarily somewhat reduced by valve opening) against the requirement for rapid flow during transients. It is also important to retain transmission stability during valve opening and closing. The currently preferred characteristics can be understood from FIGS. 5 and 6, although it must be understood that continued development may in time show other characteristics to be favoured.

Figure 5:
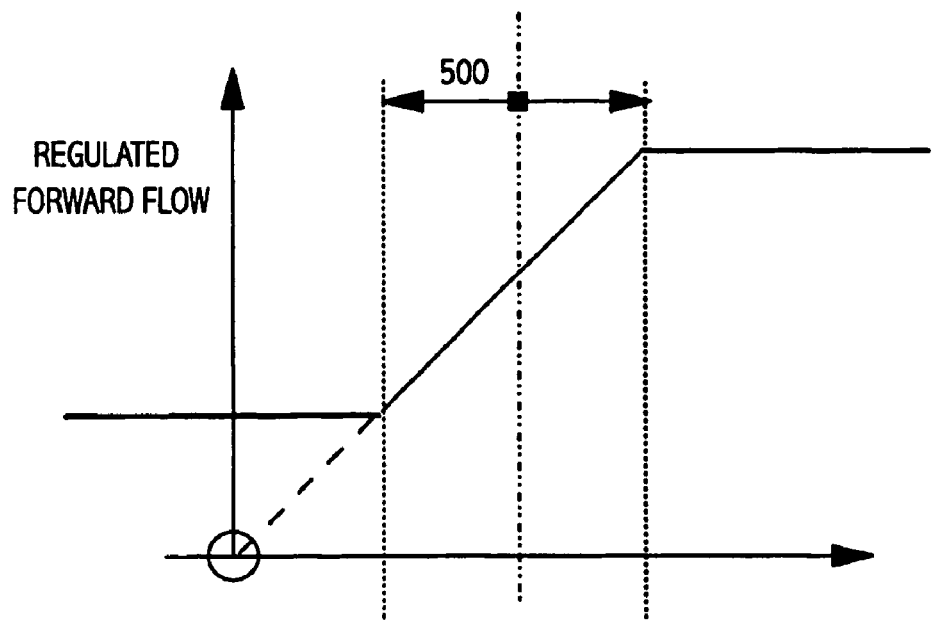
FIG. 5 is a graph of total forward flow in a flow line of the FIG. 2 circuit against flow through a flow restrictor of the circuit.

In FIG. 5 the vertical axis corresponds to forward flow through the pressure control valve 116 or 216 and the horizontal axis to forward flow through the corresponding restrictor 150, 250. In the control deadband region 500 the relevant compensation valve 152, 252 is closed. The flow through the restrictor and the pressure control valve are thus the same and the graph has the form of a straight line through the axis. When the flow into the regulator exceeds the deadband region, opening of the compensation valve vents fluid and, in the illustrated case, the consequent flow through the pressure control valve is controlled by the progressive valve response such as to be largely constant (or in fact subject to a very gradual rise with restrictor flow). Similarly when flow into the regulator falls below the deadband, the compensation valve maintains a largely constant minimum level of flow.

Figure 6:
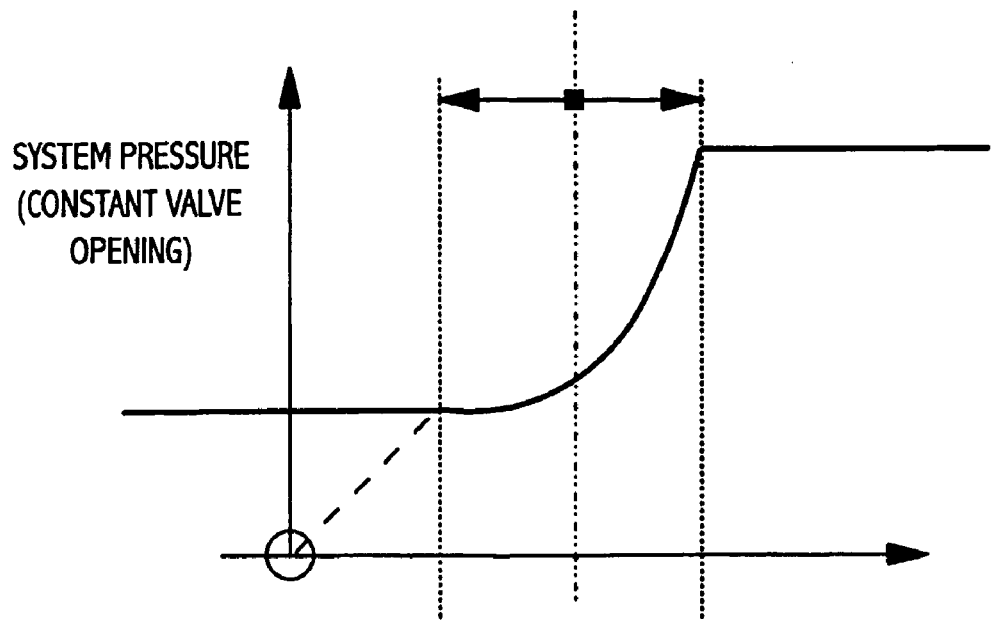
FIG. 6 is a graph of pressure against flow through the restrictor.

The way this flow characteristic relates to pressure, given constant opening of the pressure control valves 116, 216, is seen in FIG. 6, which shows flow line pressure (vertical axis) against flow into the restrictor. In the deadband region the graph is roughly a square function, back pressure being related to the square of the flow rate. Outside this region, the compensation valve serves essentially to set a maximum and a minimum pressure in the flow line, related of course to the opening of the respective control valve 116, 216. It is important to note that while the illustrated flow characteristic represents a situation in which opening of the pressure control valve 116 or 216 is kept constant, in practice these valves are typically to be adjusted in response to a transient so that although flow rates in the two flow lines may be affected by the transient, differential pressure in the two lines need not be greatly altered.

Numerous possible variations of the above described exemplary circuit will be apparent to those skilled in the art. For example, while the illustrated circuit allows both excessively high and excessively low flow rates to be compensated, the circuit may instead provide only for venting of fluid from the circuit's high pressure side, the pressure drop on the low pressure side (which of course cannot amount to a hydraulic lock) being accepted or compensated in some other way. Various suitable constructions for the compensation valves 152, 252 will be known to the skilled person and whereas the illustrated valve is hydraulically controlled, an electronically controlled valve could conceivably be used.

In further embodiments of the present invention, flow control valves may be used in the flow lines to enable required flow rates without undesired extremes of pressure.

Figure 7:
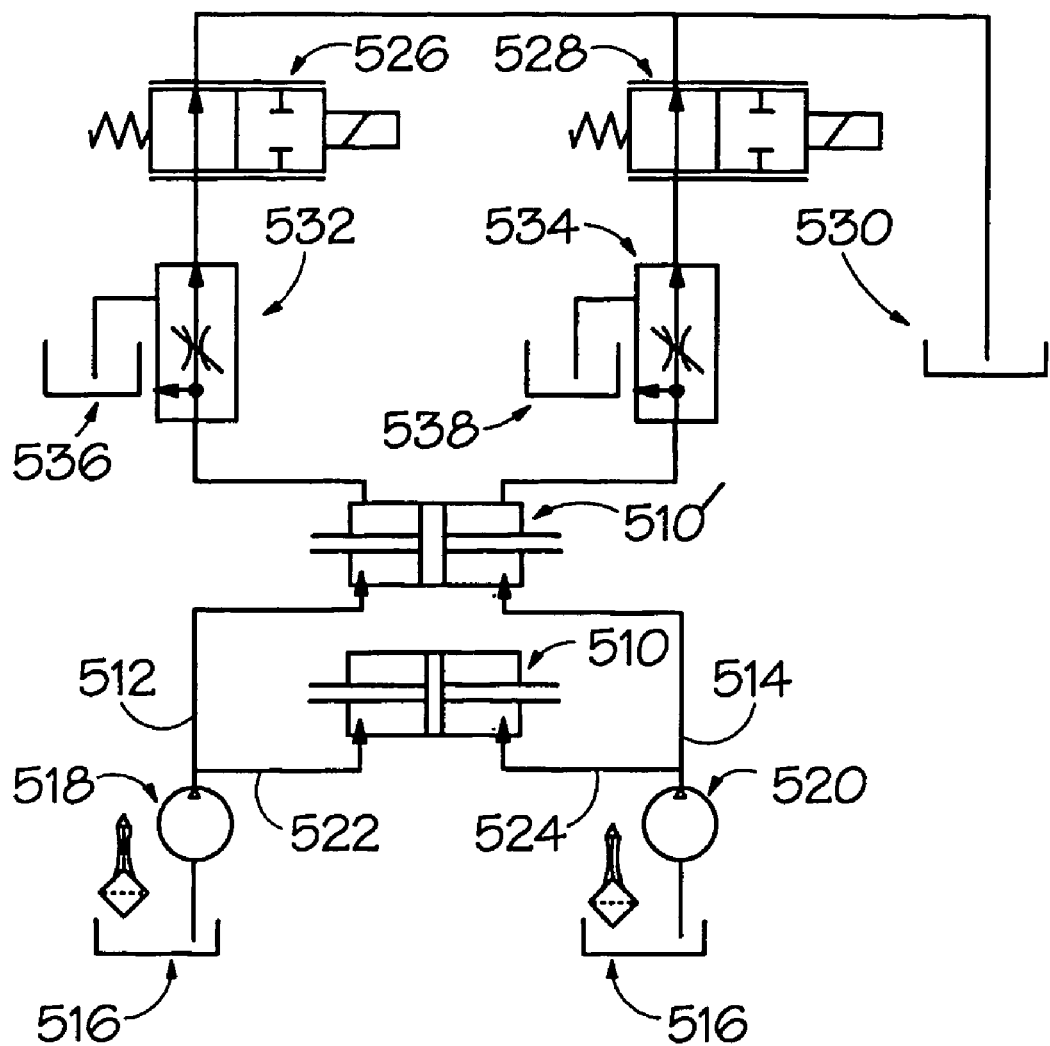
FIG. 7 is a schematic diagram of a further hydraulic circuit embodying the present invention.

FIG. 7 illustrates such an embodiment in schematic form and shows a plurality of double-acting actuator pistons 510, each of which is arranged to control the position of a respective roller (not illustrated) of a toroidal-race rolling-traction type variator, as before. Only two of the pistons 510 are illustrated in FIG. 7, for the sake of clarity.

As in the earlier circuits, hydraulic fluid is fed to each of the two faces of each piston 510 from a respective one of two flow lines 512, 514. Hydraulic fluid is supplied under pressure from a sump 516 into each of the left and right hand flow lines 512, 514 by means of an associated pump 518, 520 (typically operating at an output between 0 and 50 bar) and is supplied to the faces of each piston 510. In FIG. 7, the uppermost piston 510' is the master piston and is fed with hydraulic fluid directly from the pumps 518, 520. The remaining pistons 510 are known as "slave" pistons which are connected to the left and right-hand flow lines 512, 514 by supply branches 522, 524 respectively, the pressures in the branches 522, 524 following the pressures applied to the respective piston faces of the master piston 510'. In the arrangement as illustrated, a single piston 510' forms the master piston. However, and as will be appreciated by those skilled in the art, one side of a first piston for the other flow lines 512, 514.

The pumps 518, 520 provide hydraulic fluid to the pistons at the pump outlet pressure when control valves 526, 528 located downstream of the pistons 510 in the left and right-hand flow lines 512, 514 are sufficiently restricted. Thus by controlling the degree to which each of the valves 526, 528 is closed, pressures are applied to the opposite faces of the pistons to control the variator. The left and right-hand flow lines 512, 514 combine downstream of the control valves 26, 28 and normally lead to drain 530.

The FIG. 7 arrangement as described thus far is generally conventional. However, it will be observed that a respective one of two identical flow control valves 532, 534 is located in each of the left and right-hand flow lines 512, 514 between the pistons 510 and the respective control valves 526, 528. The flow control valves 532, 534 are of conventional construction and operate to limit or cap the flow of hydraulic fluid which can pass through the valves to the respective control valve 532, 534. If fluid flow into the flow control valves 532, 534 exceeds the predetermined limit or cap value (which, typically, may be 5 l/min) any excess flow is discharged to drain 536, 538, the capped flow being supplied to the respective control valve 526, 528. Flow control to the control valves 532, 534 is unaffected by rates of flow below the predetermined limit or cap value.

When transient ratio changes occur due to manoeuvres such as braking, rapid input (engine) acceleration or abuse, the pistons 510 move rapidly in response, ejecting large flows of hydraulic fluid into one of the flow lines 512, 514. However, as a result of the flow control valves 532, 534, the flow rate received by the control valves 526, 528 never exceeds the predetermined value set by the flow control valves 532, 534. Thus, extremes of flow line pressure and loss of system controllability and abuse tolerance associated with the prior art can be avoided.

Figure 8:
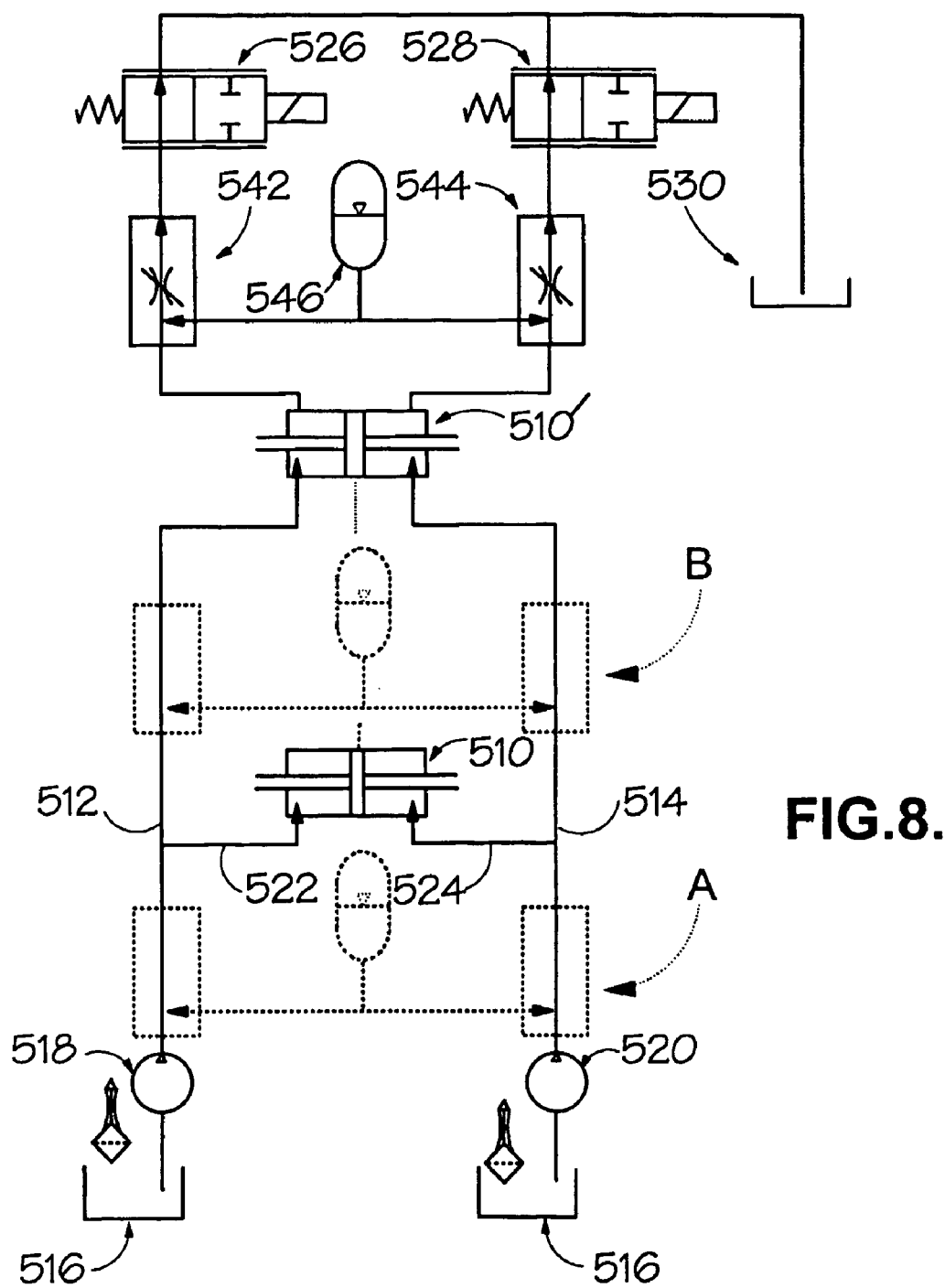
FIG. 8 is a schematic diagram of still a further hydraulic circuit embodying the present invention.
Figure 9:
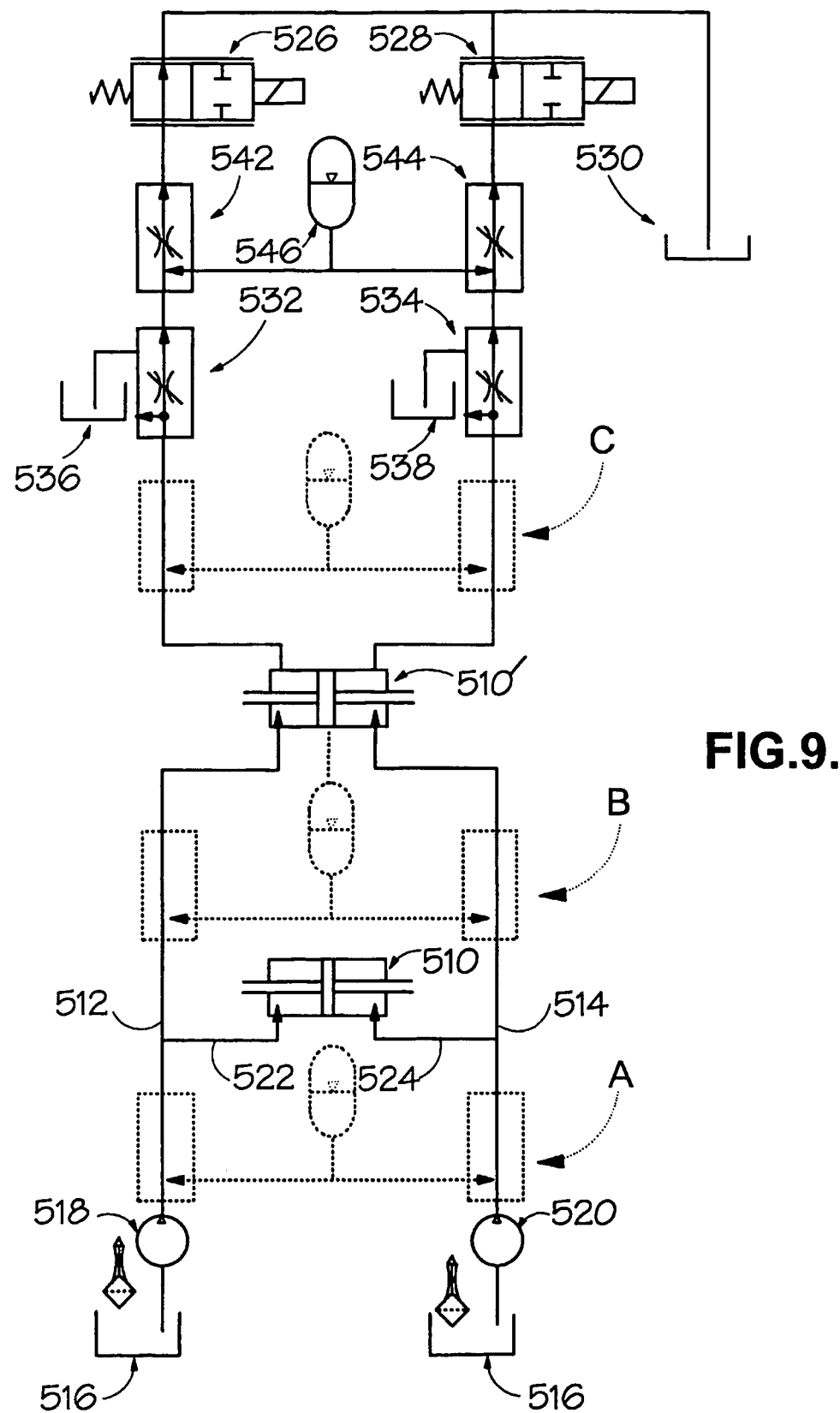
FIG. 9 is a schematic diagram of yet a further hydraulic circuit embodying the present invention.

The construction of the embodiment illustrated in FIG. 8 is similar to that of FIG. 7 and the same reference numerals are used to denote the same features as in FIG. 7. However, the significant difference is the replacement of the flow control valves 532, 534 of FIG. 7 with two identical flow boost valves 542, 544, a respective one valve being located in each of the left- and right-hand flow lines 512, 514, and a hydraulic fluid accumulator 546 being connected to the flow boost valves 542, 544.

The flow boost valves 542, 544 are of conventional construction and each valve is arranged to connect the accumulator 546 to the flow lines 512, 514 in which the valve 542, 544 is located when the flow rate in the associated flow line 512, 514 falls below a preset value, typically 5 l/min. This ensures that the fluid flow in the flow lines does not fall below a minimum value. For flow rates in excess of the preset value in the flow line 512, 514, the accumulator is isolated from the flow line by the valve 542, 544.

Thus, additional pressure from the accumulator 546 is supplied to either or both of the flow lines 512, 514 whenever the flow rate in the flow line 512, 514 falls below a predetermined value. During rapid ratio changes, one side of the pistons 510 will be evacuated. The rate of evacuation may be so great that cavitation or relative flow would normally occur, thereby contributing to control problems. However, by using the flow boost valves, 542, 544, hydraulic pressure from the accumulator 546 is supplied to one or both of the flow lines 512, 514 whenever the evacuation rate exceeds a predetermined level, thereby ensuring that the flow lines 512, 514 are maintained at or above a miminum pressure.

In the embodiment of FIG. 8, the flow boost valves 542, 544 are connected downstream of the pistons 510 and upstream of the main flow control valves 526, 528. However, the flow boost valves may be located at other positions within the valve circuit, upstream of the main control valves 526, 528. For example, and as variator of the toroidal-race rolling-traction type, the invention is equally applicable to other types of variators (e.g. the band-and-sheave type variators) as indicated previously.

The invention claimed is:

1. A hydraulic circuit for a continuously variable transmission comprising a continuously variable ratio transmission unit ("variator") which is controllable by application of fluid pressure to at least one hydraulic actuator acting on a movable torque transmission element of the variator, the circuit comprising a fluid supply line connected to the hydraulic actuator for feeding fluid to and from the hydraulic actuator, means for providing a flow of fluid through the fluid supply line, variable control valve means in the fluid supply line downstream of the connection to the hydraulic actuator for generating an adjustable back pressure in the fluid supply line, and further valve means connected to the fluid supply line, the further valve means being responsive to rate of fluid flow in the supply line, downstream of the connection to the hydraulic actuator and upstream of the control valve means, thereby to selectively modify pressure in the supply line in response to changes in flow rate created by movement of the actuator.

2. A hydraulic control circuit as claimed in claim 1 wherein the further valve means comprises a valve which controls a further connection to the supply line to modify pressure in the supply line.

3. A hydraulic control circuit as claimed in claim 2 wherein the valve is controlled to maintain a substantially constant degree of opening while the rate of flow in the supply line is within a chosen range.

4. A hydraulic control circuit as claimed in claim 3 wherein the valve is closed while the rate of flow is within the chosen range.

5. A hydraulic control circuit as claimed in claim 2, wherein the valve has a variable opening controlled as a function of supply line flow rate.

6. A hydraulic control circuit as claimed in claim 1, further comprising a flow restrictor in the flow line.

7. A hydraulic control circuit as claimed in claim 6, wherein the flow restrictor is formed as a metering orifice in the flow line having a reduced cross section relative to other parts of the flow line.

8. A hydraulic control circuit as claimed in claim 6, wherein the further valve means responds to pressure differential across the flow restrictor.

9. A hydraulic control circuit as claimed in claim 8, wherein the further valve means is normally closed and opens in response to excess pressure differential across the flow restrictor.

10. A hydraulic control circuit as claimed in claim 6, wherein the further valve means comprises a pilot operated valve having a spool which is controlled by pilot pressures from upstream and downstream of the flow restrictor.

11. A hydraulic control circuit as claimed in claim 10, wherein the pilot operated valve has a deadband within which changes to the pilot pressures produce no substantial change in the degree of opening of the valve.

12. A hydraulic control circuit as claimed in claim 11, wherein the pilot operated valve is closed in its deadband.

13. A hydraulic control circuit as claimed in claim 1, wherein the further valve means controls a path to a low pressure area in order to vent excess flow from the flow line.

14. A hydraulic control circuit as claimed in claim 1, wherein the further valve means controls a path connected to a pressurized accumulator in order to selectively supplement fluid flow in the flow line.

15. A hydraulic control circuit as claimed in claim 1, wherein the further valve means controls respective paths to a low pressure area and to a pressurized accumulator.

16. A hydraulic control circuit as claimed in claim 15, wherein the further valve means comprises a double pilot operated directional control valve.

17. A hydraulic control circuit as claimed in claim 1, wherein the further valve means comprises a flow limiting valve in the supply line.

18. A hydraulic control circuit as claimed in claim 17, wherein the flow limiting valve limits the maximum flow of fluid to the variable control valve means.

19. A hydraulic control circuit as claimed in claim 18, wherein the flow limiting valve serves as a boost valve means for ensuring a minimum flow of fluid to the variable control valve means.

20. A hydraulic control circuit as claimed in claim 19, wherein the boost valve means is adapted to connect a source of pressurized fluid to the supply line in the event that the flow through the fluid supply line falls to a predetermined value.

21. A hydraulic control circuit as claimed in claim 19, wherein the boost valve means is located downstream of the connection to the hydraulic actuator.

22. A hydraulic control circuit as claimed in claim 19, wherein the boost valve means is located upstream of the connection to the hydraulic actuator.

23. A hydraulic control circuit as claimed in claim 19, comprising a plurality of hydraulic actuators each connected to the fluid supply line and wherein the boost valve means is located upstream of one or more of the hydraulic actuators.

24. A hydraulic control circuit as claimed in claim 1, comprising a pair of fluid supply lines, the hydraulic actuator being double acting and receiving opposed fluid pressures from the two supply lines, each supply line having a said variable control valve means and a said further valve means.

25. A continuously variable transmission comprising a hydraulic control circuit as claimed in claim 24, wherein the variator is of the toroidal-race, rolling-traction type comprising at least one pair of toroidally recessed discs with rollers interposed between the discs, the variator adjustment means comprising a plurality of fluid-actuated pistons, each connected to a respective one of the rollers, each of the two sides of the pistons being connected to a respective one of said fluid supply lines.

* * * * *